United States Patent

[11] 3,585,285

[72] Inventor John L. Rennick
Elmwood Park, Ill.

[21] Appl. No. 777,760
[22] Filed Nov. 21, 1968
[45] Patented June 15, 1971
[73] Assignee Zenith Radio Corporation
Chicago, Ill.

[54] SUBCARRIER REGENERATION SYSTEM

22 Claims, 1 Drawing Fig.

[52] U.S. Cl. .......... 178/5.4SY, 328/155, 330/69, 330/30 D
[51] Int. Cl. .......... H04n 9/46, H03f 3/04, H03f 21/00
[50] Field of Search .......... 330/69, 30 D; 328/155; 307/232, 262; 333/28, 29; 178/5.4 SY, 5.4 AC, 5.4 HE, 5.4 SD; 329/50

[56] References Cited

UNITED STATES PATENTS 3,459,884 8/1969 Spies .......... 178/5.4

*Primary Examiner*—Robert L. Griffin
*Assistant Examiner*—John C. Martin
*Attorneys*—Francis W. Crotty and Eugene M. Cummings

ABSTRACT: A subcarrier regeneration stage and control arrangement for a color television receiver includes a 3.58 MHz. crystal-controlled oscillator, a phase detector and a novel voltage-controllable phase shift network in the feedback loop of the oscillator for maintaining the oscillator in phase synchronism with a received NTSC reference burst signal. The phase shift network comprises a pair of transistors differentially gain-controlled by the phase detector output voltage and having their collectors coupled to respective ends of a passive phase shift circuit such that the output from one transistor is phase-advanced and the output from the other transistor is phase-retarded. The oscillator signal is concurrently applied to the emitters of the two transistors and translated through the network with a net phase shift dependent on the detector controlled gain differential between the two transistors. Also incorporated in the regeneration stage is a hue control circuit employing a second pair of transistors differentially gain-controlled by a DC control voltage from a viewer-adjustable hue control to vary the phase of the oscillator signal as applied to the demodulator. This second pair of transistors is forward biased by a control circuit during the intervals between synchronizing bursts to disable the phase detector, thereby minimizing drift and preventing the detector from responding to chrominance information signals and noise, and is back-biased during reference burst intervals to prevent translation of the oscillator output signal to the demodulator during these periods. Because the regeneration stage utilizes differentially paired transistors throughout and a minimum of inductive components, it is particularly well suited for construction in microelectronic form.

PATENTED JUN 15 1971 3,585,285
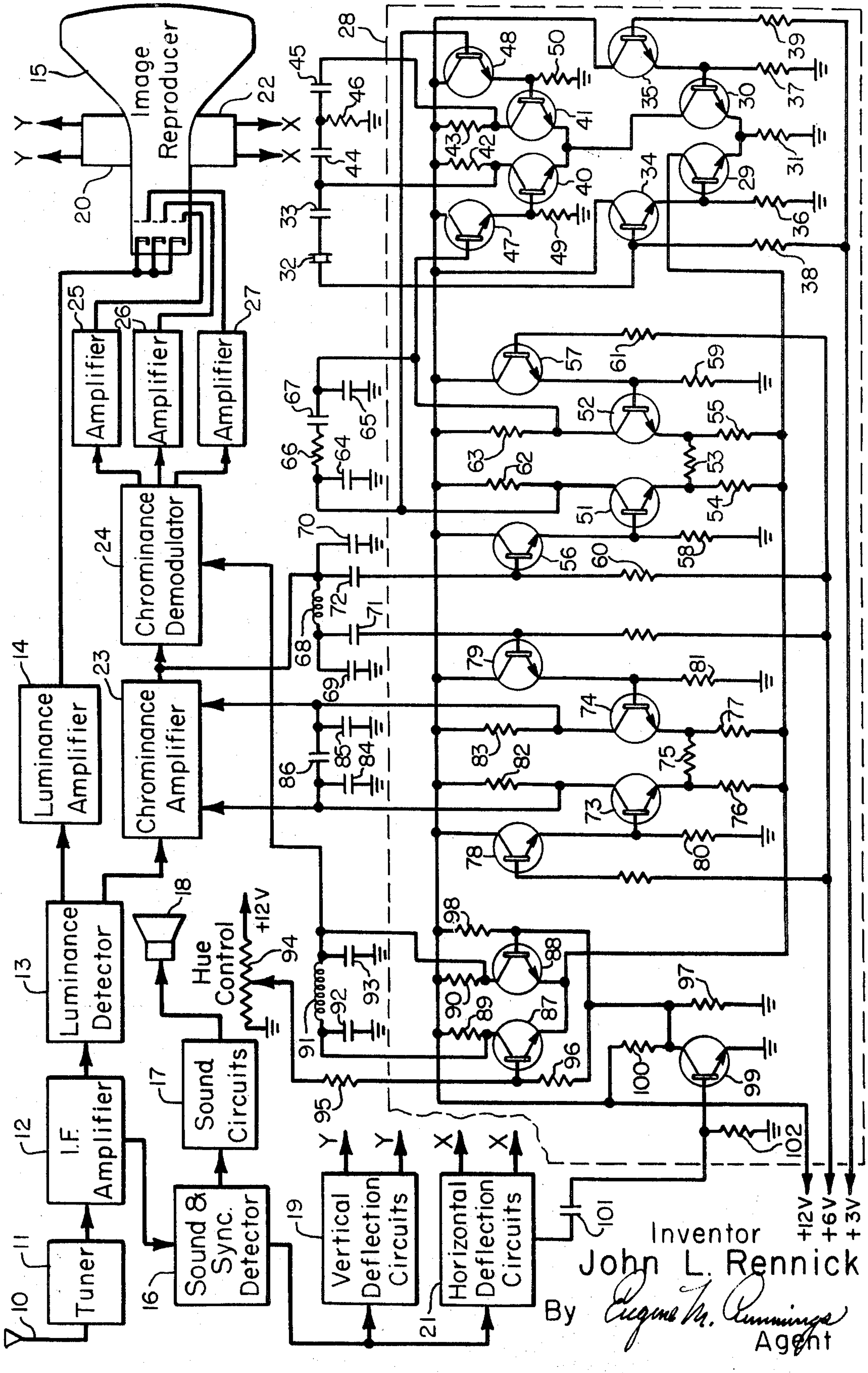
Inventor
John L. Rennick
By Eugene M. Cummings
Agent

SUBCARRIER REGENERATION SYSTEM

BACKGROUND OF THE INVENTION

The present invention relates to improvements in color television receivers and more particularly, to an improved subcarrier regeneration stage and control arrangement for use therein.

In accordance with present NTSC standards governing color television transmissions, luminance information, representing elemental brightness variations in the televised image, is transmitted on an amplitude-modulated main carrier component and chrominance information, representing elemental color hue and saturation variations, is transmitted on a phase- and amplitude-modulated 3.58 MHz. subcarrier component. At the receiver the luminance component is demodulated by a conventional AM video detector, amplified and applied to the three cathodes of the receiver image reproducer, which in present practice takes the form of a three gun tricolor shadow-mask cathode-ray tube. The chrominance component is demodulated in a chrominance demodulator stage by synchronous detection, whereby three separate color-control signals in the form of R–Y, B–Y and G–Y are obtained for application to the red, blue and green guns of the image reproducer, respectively. Internal matrixing of the luminance and color-control signals then takes place within the image reproducer to produce an image having hue, color and saturation characteristics like those of the transmitted image.

Synchronous demodulators for responding to the chrominance signal require for their operation a continuous wave demodulation or reference signal phase and frequency synchronized to the modulated subcarrier component of the chrominance signal, and this signal is ordinarily generated in a subcarrier regeneration stage which utilizes reference bursts of the subcarrier component transmitted at recurring time intervals during NTSC color programs for purposes of synchronization. The advent of microelectronic television circuitry, and especially the advent of economical high-performance chrominance demodulator circuitry in integrated form, such as that described in the copending application of the present applicant, Ser. No. 629,764, filed Apr. 10, 1967, now U.S. Letters Pat. No. 3,506,776 issued Apr. 14, 1970, has made it highly desirable that the subcarrier regeneration stage also be developed of such character as to lend itself to microelectronic construction, either in monolithic, thin film, or thick film form.

One difficulty encountered in the development of a microelectronic subcarrier regeneration stage has been the lack of a suitable phase shift circuit for adjusting the phase of the 3.58 MHz. oscillator to maintain synchronism with the received reference sync bursts. The traditional approach, namely, a variable reactance control circuit coupled across the resonant element of the continuous wave oscillator, is unsuited because of the difficulties of manufacturing such a circuit in integrated circuit form with any degree of consistency. In contrast, a phase shift circuit is proposed herein which utilizes a differentially connected pair of transistors which, in integrated form, are inherently balanced and therefore allow the circuit to be mass produced with excellent consistency. Furthermore, the proposed phase-shift circuit has no inductive component and is associated with an oscillator which likewise includes no inductive component, further lending the circuitry to integrated circuit construction, where inductors, at least in the present state of the art, cannot be made as a practical matter.

Several additional problems are encountered in the development of a microelectronic subcarrier regeneration stage. First, an automatic phase control (APC) detector must be provided, preferably in integrated form, to generate a control signal for application to the variable phase-shift network included in the 3.58 MHz. oscillator to achieve synchronism between that oscillator and the received reference sync bursts. Secondly, this phase detector should desirably be prevented from responding to chrominance information signals and extraneous noise signals occuring during the periods between reference sync burst transmissions. Thirdly, the supply of the continuous wave reference signal generated by the 3.58 MHz. oscillator to the receiver chrominance demodulator should be interrupted during reception of reference sync bursts in order to prevent erroneous output signals from that stage. To these ends, a second aspect of the invention proposes an arrangement suitable for production in integrated circuit form which meets these additional requirements of the phase-controlled reference oscillator.

SUMMARY OF THE INVENTION

Accordingly, it is a general object of the invention to provide a new and improved subcarrier regeneration stage useful, for example, for supplying a continuous wave 3.58 MHz. reference signal to the chrominance demodulator of a color television receiver.

It is a more specific object of the invention to provide a novel subcarrier regeneration stage which is particularly suited for manufacture in integrated circuit form.

It is another general object of the invention to provide a new phase-shift network for production in integrated circuit form.

It is another more specific object of the invention to provide a voltage controllable phase-shift circuit having no discrete inductive component and, therefore, adaptable to low-cost high-volume production in integrated circuit form.

It is another and particular object of the invention to provide a novel control arrangement for association with an integrated circuit subcarrier regeneration stage.

The invention is directed to a signal translating network for providing an adjustable degree of phase shift to an applied input signal. The network comprises a first differential amplifier including a pair of amplifying devices each having input, output and common electrodes and at least one of the devices being gain-dependent on an applied control voltage. Phase shifting means are coupled between the output electrodes of the amplifying devices and means are provided for applying the input signal concurrently to the input electrodes of the amplifying devices. The network further comprises means for deriving from the output electrodes of the amplifying devices an output signal having a phase related to the phase of the input signal according to the differential in gain between the devices, and control means for applying the control voltage to the one device to determine the phase of the output signal.

The invention is further directed to a chrominance demodulation system for developing from a phase and amplitude modulated subcarrier and periodically recurrent reference sync burst signals a plurality of color information signals for application to the image reproducer of a color television receiver. The system comprises a phase-controllable oscillator for producing a reference signal phase synchronized to the sync burst signal, and demodulator means for utilizing the signal to derive the color information signals from the modulated subcarrier. Further included are a detector responsive to the reference signal and to the sync burst signal for generating a control effect having an amplitude which varies with variations in a predetermined characteristic of the reference signal, and means for utilizing the control effect to adjust an operating parameter of the system. Means coupled between the oscillator and the demodulator means are included for translating the reference signal to the demodulator means only during the intervals between the sync burst signals and for rendering the detector responsive only during the presence of the burst signals.

BRIEF DESCRIPTION OF THE DRAWING

The features of the present invention which are believed to be novel are set forth with particularity in the appended claims. The invention, together with further objects and advantages thereof, may best be understood by reference to the following description taken in connection with the accompanying drawing, in which the single FIGURE illustrates a color television receiver employing a subcarrier regeneration stage and control arrangement constructed in accordance with the invention.

DESCRIPTION OF THE PREFERRED EMBODIMENT

With the exception of certain detailed circuitry in its subcarrier regeneration stage and associated control arrangement, the illustrated receiver is essentially conventional and accordingly only a brief description of its structure and operation need be given. A received signal is intercepted by an antenna 10 and coupled in conventional manner to a tuner 11, which includes the usual radio frequency amplifying and heterodyning stages for translating the signal to an intermediate frequency. After amplification by an intermediate frequency amplifier 12, the signal is applied to a luminance and chrominance detector 13, wherein luminance and chrominance information in the form of a composite video signal is derived. The luminance component of the composite signal is amplified in a luminance amplifier 14 and applied to the three cathodes of a conventional tricolor trigun cathode-ray type of image reproducer 15.

The output of intermediate frequency amplifier 12 is also applied to a sound and sync detector 16, wherein a composite video frequency signal is derived which includes both sound and synchronizing components. The sound components are applied to sound circuits 17, wherein conventional sound demodulation and amplification circuitry develop an audio output signal suitable for driving a loudspeaker 18.

Synchronizing information, in the form of vertical and horizontal sync pulses is separated from the composite signal and applied to vertical deflection circuits 19, wherein the vertical sync pulses are utilized to generate a synchronized vertical-rate sawtooth scanning signal for a vertical deflection winding 20 associated with picture tube 15. The horizontal sync pulses from detector 16 are applied to horizontal deflection circuits 21, which utilize these pulses in generating synchronized horizontal-rate sawtooth scanning current for a horizontal deflection winding 22 associated with picture tube 15.

The chrominance components of the composite video frequency output signal of luminance and chrominance detector 13 are applied to a chrominance amplifier stage 23, which includes band-pass amplification circuitry together with control circuitry responsive to an externally applied control signal of differential form for varying the gain of the stage to maintain a constant chrominance output signal therefrom during the reception of chrominance transmissions and for preventing translation of the chrominance signal during reception of monochrome transmissions. The amplified chrominance output signal from amplifier 23 is applied to a chrominance demodulator 24, which is a known form of synchronous demodulator preferably constructed in integrated circuit form in accordance with the teaching of the previously mentioned copending application of the present applicant, Ser. NO. 629,764. In response to the concurrent application of a continuous wave reference signal, phase and frequency synchronized to the NTSC modulated subcarrier component of the received program signal, this demodulator functions to derive three color control signals in the familiar form of R–Y, G–Y and B–Y. These color control signals are applied to individual ones of three identical color-difference signal amplifiers 25, 26 and 27, wherein they are amplified before application to the control grids of the red, green and blue guns of image reproducer 15.

The concurrent application of the luminance signal to the cathodes and the color control signals to the control girds of the three electron guns in tube 15 results in internal matrixing, as stated above, and modulation of the three electron beams as required for the reproduction of images in simulated natural color as those beams are caused to scan the image area of tube 15 under the influence of deflection fields established by windings 20 and 22. This is all thoroughly understood in the art as is the requirement for and accomplishment of dynamic convergence which has been omitted from discussion for the sake of simplicity. Particular consideration will now be given to those portions of the chrominance demodulation system which utilize the various aspects of the present invention.

To generate the continuous wave reference signal required by synchronous demodulator 24, there is included in the receiver a subcarrier regeneration stage and control arrangement 28 which, with the exception of the few external components not contained within dashed outline 28, is constructed in integrated circuit form on a single substrate and encapsulated in a single compact package. This arrangement comprises a 3.58 MHz. crystal oscillator, automatic-phase-control (APC) means for synchronizing the oscillator to received NTSC sync reference burst transmissions, and gating means for interrupting translation of the reference signal to the chrominance demodulator during those intervals assigned for transmission of the reference sync bursts. Furthermore, the arrangement includes a hue control in the form of a voltage-controlled phase-shift network which varies the phase of the continuous wave reference signal as applied to chrominance demodulator 24 in accordance with an externally generated control bias, and an automatic-chroma-control (ACC) detector for generating an ACC voltage for adjusting the gain of amplifier 23 to maintain a constant chrominance signal output level therefrom.

The 3.58 MHz. oscillator included in subcarrier regeneration stage 28 comprises a pair of differentially connected amplifier devices, transistors 29 and 30, coupled in tandem by a common emitter impedance to ground, resistor 31. To achieve oscillation, the amplified output signal from the pair is translated from the collector of transistor 30 through a positive feedback loop back to the input of the devices, the base of transistor 29. The output signal is also delivered from the collector of transistor 29 to a signal bus for distribution to the various circuits of the stage under consideration.

To achieve the degree of frequency stability necessary for chrominance demodulation, the feedback loop includes a fixed frequency phase-shifting network in the form of a crystal 32 and an associated series capacitor 33. At their resonant frequency of 3.58 MHz. these components introduce no phase shift, and being essentially temperature and voltage independent, add greatly to the frequency stability of the oscillator. To increase its effective input impedance, oscillator transistor 29 has connected to it in emitter-follower configuration an additional transistor 34, which translates the feedback signal without inversion to the base of transistor 29. Oscillator transistor 30 similarly has associated with it an emitter-follower transistor 35, but only to preserve DC balance between transistors 29 and 30. A pair of resistors, 36 and 37, are connected from respective ones of the bases of transistors 29 and 30 to ground to supply operating bias to these devices, and another pair of resistors, 38 and 39, are connected from respective ones of the bases of emitter-follower transistors 34 and 35 to the receiver +3 volt bus to supply operating bias to the emitter-follower transistors.

To permit the oscillator to be synchronized to the NTSC reference sync bursts, it is necessary that the frequency and phase of the oscillator be controllable by an externally applied control effect, or control voltage. Since the frequency and phase of the oscillator depend on the feedback loop providing zero phase shift, this end is conveniently accomplished by serially including in the feedback loop a network which introduces varying degrees of phase shift according to an applied control voltage.

In accordance with one aspect of the invention, this variable-phase-shift network comprises a pair of differentially connected amplifier devices, transistors 40 and 41, having their input electrodes, or emitters, connected together and to the collector of transistor 30 to concurrently receive the continuous wave output signal from the 3.58 MHz. oscillator. The output electrodes, or collectors, of transistors 40 and 41 are connected to a source of operating potential, the receiver +12 v. supply bus, by individual collector load resistors 42 and 43, respectively, and are coupled to each other by a pair of series-connected capacitors 44 and 45 and a resistor 46 connected from the juncture of the capacitors to ground.

Assuming that transistor 40 is cut off and only transistor 41 is conductive, capacitors 44 and 45 and resistors 42, 43 and 46 together form an RC high pass phase-shift network which translates the output signal at the collector of transistor 41, the 3.58 MHz. oscillator signal, with a net phase advance of 45°. Conversely, while transistor 41 is cut off and only transistor 40 is conductive, these same components cause the output signal at the collector of transistor 40 to be translated with a phase delay of 45°. Accordingly, by varying the relative conduction of transistors 40 and 41, it is possible to introduce into the feedback loop any amount of phase-shift from +45° to −45° or by making the transistors equally conductive, no phase shift. This is so because the output signal of the phase-shift network is the vector sum of the two signals; the phase-retarded signal from transistor 40, and the phase-advanced signal from transistor 41.

The relative conduction of transistors 40 and 41 is controlled by applying to the control electrodes, or bases, of these devices variable biases, or control voltage, having a differential relationship i.e., one increases as the other decreases. To increase the apparent input impedance of their control electrodes, transistors 40 and 41 have associated with them emitter-follower transistors 47 and 48, respectively. Bias is supplied to the base of transistor 40 through transistor 47 and a resistor 49 connected to ground, and to the base of transistor 41 through transistor 48 and a resistor 50 connected to ground.

To supply the necessary differential control voltages for controlling the variable phase-shift network to maintain the 3.58 MHz. oscillator in synchronism with the NTSC reference sync bursts, control arrangement 28 includes an automatic-phase-control (APC) detector. In its preferred form, this detector comprises a pair of differentially connected amplifier devices, transistors 51 and 52, having their emitters cross coupled by a resistor 53 and coupled to the oscillator output signal bus by individual emitter bias resistors 54 and 55, respectively.

As in the 3.58 MHz. oscillator, the differential pair in the APC detector has associated with it a pair of emitter-follower transistors 56 and 57, transistor 56 increasing the apparent input impedance of the pair and transistor 57 preserving DC balance in transistor 52. A pair of resistors 58 and 59 are connected from the bases of transistors 51 and 52, respectively, to ground to supply proper operating bias to these devices via transistors 56 and 57, respectively. Another pair of resistors 60 and 61 are connected from the base electrodes of transistors 56 and 57 to the receiver +6 v. supply bus to supply operating bias to those devices.

The APC phase detector transistors 51 and 52 have associated with them collector load impedances 62 and 63, respectively, and a pair of bypass capacitors, 64 and 65, for attenuating any 3.58 MHz. signal components, and to a lesser extent any 15.75 KHz. switching-rate components, present at the collectors. A resistor 66 and a capacitor 67 serially connected between the two collectors further filter the output and serve to establish in the APC circuit a predetermined time constant sufficiently long to prevent undesirable hunting of the oscillator following momentary burst signal interruption, but short enough to allow rapid synchronization with the burst following signal transitions.

In operation, a burst of 3.58 MHz. signal, included in the chrominance signal for synchronization purposes, is translated from the output of chrominance amplifier 23 without phase shift through emitter-follower 56 to the input of the differential pair, that is, to the base electrode of transistor 51. This sync burst has a nominal quadrature phase relation to the continuous wave reference signal from oscillator 29, 30. Assuming transistors 51 and 52 to be conductive, this burst sync signal also appears with a 180° phase shift on the collector of transistor 51 and, by virtue of the cross coupling provided by resistor 53, appears with no phase shift on the collector of transistor 52. Since the 3.58 MHz. continuous wave reference signal is simultaneously applied to the emitters of transistors 51 and 52 via resistors 54 and 55, and is translated without phase inversion by these devices to their collector electrodes, the DC voltage at the collectors of these transistors is a function of the phase relations of the two applied signals. Specifically, the DC voltage at the collector of transistor 51 depends on the vector addition of the 3.58 MHz. continuous wave reference signal and the 180° out-of-phase reference sync burst, while at the collector of transistor 52 the DC voltage depends on the vector sum of the continuous wave reference signal and the in-phase reference sync burst signal.

It will be readily appreciated that for there to be no error signal from this APC detector, i.e., a condition of equal collector voltages, the reference sync burst and the 3.58 MHz. continuous-wave reference signal must be in phase quadrature, or 90° out-of-phase, at each transistor 51 and 52. In the presence of any other phase relationship the DC collector voltages of transistors 51, 52 will be unequal and their differential is utilized as an error signal to reestablish the 90° or quadrature phase relationship indicative of the fact that reference oscillator 29, 30 is in frequency and phase synchronism with the reference sync bursts of the chrominance signal. More specifically. the connections from the collectors of transistors 51, 52 to the bases of transistors 48, 47 respectively change the gain of the latter transistors differentially to restore appropriate phase conditions. For example, if it be assumed that the differential voltage developed by transistors 51, 52 indicates that the frequency and phase of the continuous-wave reference signal leads the reference burst signal, the gain of transistor 40 increases and the gain of transistor 41 decreases to reestablish proper phase conditions. Conversely, should the differential APC voltage indicate that the continuous-wave reference signal lags the sync bursts, the gain of transistors 40, 41 is changed in the opposite sense to maintain phase synchronism.

The operation of APC detector 51, 52 has proceeded on the assumption that both the continuous wave reference signal and the sync bursts of subcarrier signal are present. At other times, that is, in the intervals between sync bursts, the detector transistors are biased to be nonconductive in a manner to be described hereafter. And, of course, appropriate circuit provisions must be made in chrominance demodulator 24 to accept the continuous wave reference signal at a 90° angle to the reference burst transmission.

An additional detector is included in control unit 28 to develop an automatic-chrominance-control (ACC) voltage for maintaining a constant signal level at the output of chrominance amplifier 23. The ACC detector is essentially identical to the previously described APC detector, except that the control voltage developed therein is dependent primarily on the levels of the applied signals rather than on their relative phases. To this end it operates as an in-phase detector with the reference sync bursts and the 3.58 MHz. continuous wave reference signal being applied thereto in like phase per force of a 90° phase-shift network located between chrominance amplifier 23, serving as the reference sync burst source, and the input of the detector. The phase-shift network may be of conventional design, and as illustrated comprises a series inductance 68 and a pair of capacitors 69 and 70 connected from either end of the inductance to ground. Coupling capacitors 71 and 72 are serially included in the signal paths to the ACC and APC phase detectors to provide DC isolation.

The ACC phase detector comprises a pair of differentially connected transistors 73 and 74 having their emitters cross coupled by a resistor 75 and coupled to the oscillator output signal bus by individual emitter bias resistors 76 and 77, respectively. Associated with the differential pair is a pair of emitter-follower transistors 78 and 79, transistor 79 increasing the apparent input impedance of the pair and transistor 78 preserving DC balance between the two transistors. A pair of resistors 80 and 81 are connected from the bases of transistors 73 and 74, respectively, to ground to supply proper operating bias to these devices via transistors 78 and 79, respectively.

The ACC phase detector transistors 73 and 74 have associated with them individual collector load impedances 82 and 83, respectively, and a pair of bypass capacitors 84 and 85, respectively, for attenuating any 3.58 MHz. spurious signal components, and to a lesser extent any 15.75 KHz. switching-rate components, present at the collectors. A capacitor 86 connected between the two collectors provides additional common mode spurious signal attenuation and provides the ACC system with an appropriate time constant.

The operation of the ACC detector is identical with that of the previously described APC detector with the exception of the phase relationship of the applied signals. In this case the reference sync bursts and the continuous wave reference signal appear at the collector of transistor 73 in-phase and at the collector of transistor 74 180° out-of-phase. It follows then that the DC voltages developed at these electrodes, which it will be recalled depend on the vector sum of the two signals, will be of differential form and dependent on the amplitude of the two signals. The two DC voltages together comprise the ACC control signal, and are applied to chrominance amplifier stage 23 wherein appropriate control circuitry responds by increasing the gain of the stage as the voltage developed by transistor 73 decreases and the voltage developed by transistor 74 increases, and by decreasing the gain of the stage as the voltage developed by transistor 73 increases and the voltage developed by transistor 74 decreases. Since the differential control signal is dependent on the amplitude of the reference sync bursts appearing at the output of the chrominance amplifier, the ACC phase detector forms a constant output feedback loop which maintains the output signal from the chrominance amplifier substantially constant at all times to assure proper functioning of chrominance demodulator 24.

To enable the hue of the reproduced image to be varied, it is necessary that the receiver include a viewer-adjustable control for varying the phase of the continuous wave reference signal applied to the chrominance demodulator. Since such a hue control must necessarily be located at a location convenient to the customer, which location may be far removed from the most direct signal path between the oscillator and the chrominance demodulator, it is highly desirable that provision be made in control arrangement 28 for shifting the phase of the 3.58 MHz. continuous wave reference signal as a function of an externally generated DC control voltage. This is accomplished by an additional phase-shift network similar to that utilized in the feedback loop of the 3.58 MHz. oscillator 29, 30.

Like the previously described phase-shift network, the hue control network comprises a pair of amplifier devices, transistors 87 and 88, having their input electrodes, or emitters, connected together and having individual load impedances 89 and 90. An LC $\pi$-type phase-shift network comprising an inductance 91 and a pair of capacitors 92 and 93 is connected between the collectors of transistors 87 and 88. The emitters of transistors 87 and 88 are connected to the oscillator output bus so that each device has applied to it the continuous wave 3.58 MHz. reference signal. The gain of transistor 87 is a function of the bias applied to its base, which bias is derived from the 12 volt supply bus via a voltage divider network serially comprising a hue control potentiometer 94 and a trio of resistors 95, 96 and 97, and, as will be discussed shortly, a novel gating circuit. The base of transistor 88 receives bias from the 12 volt supply bus by way of a resistor 98, resistor 97 and the gating circuit.

The functioning of the hue control circuit is similar to that of the variable phase-shift circuit in the oscillator feedback loop, except that a variable bias is applied to only one of the differentially paired transistors, the gain of the other transistor varying differentially by virtue of the emitters being coupled together to the oscillator output signal bus which acts as a constant current source because of the high collector impedance of oscillator transistor 29. The LC network serves to retard the phase of that portion of the continuous wave reference signal translated through transistor 87 and to advance the phase of the portion translated through transistor 88. Since the apparent phase of the resulting output signal is determined by the vector sum of these two signal components, and since the relative intensity of these components depends on the bias applied by hue control 94, the phase of the output signal, and hence the hue of the reproduced image, will vary as a function of the hue control setting.

To prevent the ACC and APC detector circuits from responding to chrominance information signals and possible extraneous noise impulses, it is necessary that these circuits be responsive to applied signals only during those periods allocated by NTSC standards for transmission of the reference burst sync signal. Also, it is desirable for optimum performance of the chrominance demodulator that the application of the continuous wave reference signal be interrupted during reception of the reference burst sync signal. To these ends, and in accordance with another aspect of the invention, the carrier regeneration stage and control arrangement 28 includes a control circuit which gates or interrupts translation of the 3.58 MHz. demodulation signal to the chrominance demodulator during reference burst intervals and renders the phase detectors nonresponsive to applied signals during intervening intervals. This circuit comprises a transistor 99 having its collector and emitter electrodes shunt connected across resistor 97 and its collector further connected to the receiver +12 volt supply bus by a resistor 100. Transistor 99 is keyed into conduction only during NTSC sync burst intervals by a suitably shaped pulse derived from the receiver horizontal deflection circuit 21 and applied by way of a coupling capacitor 101 to its base. A resistor 102 is connected from the base to ground to provide operating bias to that electrode.

During the intervals between reference sync burst transmissions, transistor 99 is nonconductive and resistors 97 and 100 form a voltage divider from the +12 volt supply bus to ground which causes a high positive bias to be applied to the base electrodes of transistors 87 and 88. This forward biases the base-emitter junctions of these devices, rendering them conductive and simultaneously establishing the oscillator output signal bus at a high positive bias. The high positive bias on the oscillator output bus reverse biases the emitter-base junctions of the four detector transistors 51, 52, 73 and 74, rendering these devices nonconductive and precluding their response to the signals continuously applied thereto from oscillator 29, 30 and from chrominance amplifier 23. Sufficient capacity is included in the output circuits of these detectors to insure continuity of a previously developed control voltage output while the detectors are temporarily disabled.

However, during burst sync intervals when transistor 99 is keyed into conduction, resistor 97 is effectively shorted and the positive bias heretofore applied via that resistor to the bases of transistors 87 and 88 and to the oscillator output signal bus is removed. This allows the control detectors to operate and reverse biases the base-emitter junctions of transistors 87 and 88, preventing translation of the 3.58 MHz. continuous wave reference signal to chrominance demodulator 24.

Since transistor 99 is rendered conductive by a pulse from horizontal deflection circuits 21 only during the sync burst reception intervals, the detector circuits function only during such intervals and the application of the continuous wave reference signal to chrominance demodulator 24 is interrupted only during such intervals. MOreover, since the response of the control detectors is confined to only the duration of the reference sync bursts, the composite signal from chrominance channel 23 can be applied directly to those detectors without an intervening burst separator stage. This results in a significant improvement in stability over prior art full time detectors, since the gated detector is subject to drift and extraneous signals for only 5—10 percent of the scanning period in which time it is actually comparing phase, and is completely inactive and incapable of introducing error for the remaining 90—95 percent of the period.

Three different voltage supply busses are utilized to power the various circuits of unit 28. In particular, the emitter-follower collectors are connected to a +12 volt bus, the bases of the emitter-follower transistors in the control detectors are connected to a +6 volt bus, and the bases of the emitter-follower transistors associated with the oscillator are connected to a +3 volt bus. This was arranged to eliminate the need for separate voltage-divider networks and associated bypass capacitors in each stage in the interest of circuit economy. It is anticipated that in practice the three required voltages would be supplied by regulated voltage dropping circuitry contained on the same substrate as the other circuitry.

The carrier-regeneration stage and control arrangement herein described employs balanced differentially paired transistors throughout, and therefore is particularly well suited for construction in integrated circuit form wherein closely matched active devices are readily constructed. In anticipation of this method of construction, the circuitry has been developed to utilize a minimum number of inductors, capacitors and resistors, with values as small as possible. Furthermore, a minumum number of connections are brought outside the substrate, indicated by dashed outline 28, to further reduce packaging and assembly costs. However, those parameters which could conceivably require change over a period of time because of changes in other circuitry in the receiver, such as the phase detector time constant circuitry, are external to the chip and therefore readily changed. Besides being very economical in mass-production quantities, it is anticipated that the illustrated arrangement would offer significant manufacturing economies by requiring less adjustment and fewer interconnections.

These benefits are achieved through a novel phase-shifting circuitry suitable for construction in integrated circuit form. This circuitry is utilized in the feedback loop of the oscillator to vary the phase of the 3.58 MHz. signal generated by that stage and in series between the oscillator and the chrominance demodulator to shift the phase of the oscillator output signal to control the hue of the reproduced image. Also, a novel switching circuit allows a single switching transistor 99 to concurrently control the translation of the continuous wave reference signal to the chrominance demodulator and the functioning of the ACC and APC detectors. Of course, the circuitry described herein may be used in other environments, such as a horizontal sweep AFC system or as a modulator in a communications transmitter.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A signal translating network providing an adjustable degree of phase shift to an applied input signal comprising:

a first differential amplifier comprising a pair of amplifying devices each having input output, and common electrodes and at least one of said devices being gain dependent on an applied control voltage;

phase shifting means coupled between the output electrodes of said amplifying devices;

means for applying said input signal concurrently to the input electrodes of said amplifying devices;

means for deriving from the output electrodes of said amplifying devices an output signal having a phase related to the phase of said input signal according to the differential in gain between said devices;

and control means for applying said control voltage to said one device to adjust the relative gain of said amplifying devices and thereby determine the phase of said output signal.

2. A signal translating network as described in claim 1 wherein said amplifying devices are transistors, said input electrodes are emitters, said common electrodes are bases, and said output electrodes are collectors.

3. A signal translating network as described in claim 2 wherein said phase-shifting means comprises a network including a pair of series-connected capacitors coupled between the collectors of said amplifying devices and a resistor coupled between the juncture of said capacitors and a plane of fixed reference potential.

4. A signal translating network as described in claim 1 wherein said phase shifting means comprises a high pass filter.

5. A signal translating network as described in claim 1 wherein said input electrodes of said first and second amplifying devices are coupled together and said means for applying said input signal to said input electrodes comprises a constant current signal source.

6. A signal translating network as described in claim 1 wherein said control means applies a voltage to the common electrode of said one amplifying device.

7. A signal translating network as described in claim 1 wherein said control means comprises a differential voltage source connected to the common electrode of respective ones of said amplifying devices for differentially varying the gain of said devices.

8. A signal translating network as described in claim 7 in which said differential voltage source comprises a pair of active electron devices having input circuits for receiving a pair of signals to be compared and having output circuits which develop voltage levels which vary differentially in accordance with the relationship of said signal pair compared to a predetermined relationship, and in which said output circuits connect to said common electrodes of said amplifying devices, respectively, to control the gain thereof differentially.

9. A variable frequency oscillator including a signal translating network as described in claim 1 and further including another amplifier having input and output electrodes interconnected by a positive feedback means, comprising a frequency-determining means that is resonant at a predetermined frequency and further comprising said network, for applying a portion of said output signal derived from said network to said input electrode of said other amplifier to sustain oscillations at a frequency and phase conjointly determined by said frequency-determining means and said network.

10. A variable frequency oscillator as described in claim 9 in which said control means develops a control voltage which varies with phase deviations of said oscillator from a reference phase condition, and in which said control voltage is applied to said amplifier in a sense to maintain said reference phase condition.

11. A variable frequency oscillator as described in claim 9 wherein said frequency-determining means comprises a crystal which is resonant at approximately the mean operating frequency of said oscillator.

12. A variable frequency oscillator as described in claim 9 in which said other amplifier comprises a second pair of amplifying devices each having input, output, and common electrodes, in which the output electrode of one amplifying device of said other amplifier couples to said input electrodes of said amplifying devices of said network, in which the input electrode of the remaining amplifying device of said other amplifier couples to said output electrodes of said amplifying devices of said network, and in which said common electrodes of said amplifying devices of said other amplifier are coupled together to constitute a second differential amplifier.

13. A variable frequency oscillator as described in claim 12 which further includes a pair of emitter followers individually having emitter electrodes connected respectively to the input electrodes of said amplifying devices of said other amplifier, having base electrodes connected to a source of potential, with one of said base electrodes also coupled to one of said output electrodes of said amplifying devices of said network, and having collector electrodes connected to a source of bias potential.

14. A hue control for a color television receiver for applying a reference signal to a chrominance demodulator with an adjustably fixed phase comprising:

a differential amplifier formed of a pair of reference signal amplifying devices each having input, output and common electrodes and at least one of said devices being gain dependent on an applied control voltage;

phase shifting means coupled between the output electrodes of said devices;

means for applying said reference signal concurrently to the input electrodes of said amplifying devices;

means for deriving from the output electrodes of said devices and for applying to said demodulator an output signal having a phase related to the phase of said reference signal according to the differential in gain between said amplifying devices; and means comprising an adjustable voltage source for applying a control voltage of adjustable amplitude to said one amplifying device to adjust the relative gain of said amplifying devices and thereby vary the phase of said output signal.

15. A hue control as described in claim 14 for a receiver for utilizing a chrominance signal having recurrent reference sync bursts in addition to chroma information, which includes an active gating electron means coupled to said amplifying devices of said reference-signal differential amplifier and responsive to an applied gating pulse to be activated from a first operating condition, in which said gating device permits said differential amplifier to apply said reference signal to said demodulator, to a second operating condition, in which said gating device biases said amplifying devices of said reference-signal differential amplifier to a nonconductive state, and which further includes means for applying to said gating device an actuating pulse occuring in time coincidence with said recurrent sync bursts.

16. A hue control as described in claim 15 in which said amplifying devices of said reference-signal differential amplifier are normally biased to a conductive state by a bias network including a source and a series-connected impedance, and in which said gating means comprises a single normally nonconductive transistor having an output circuit coupled across said impedance and having an input circuit for receiving said actuating pulse to render said transistor conductive and modify the bias condition of said amplifying devices to render said reference-signal differential amplifier nonconductive.

17. A chrominance demodulation system for developing from a phase and amplitude modulate subcarrier and periodically recurrent reference sync burst signals a plurality of color information signals for application to the image reproducer of a color television receiver, which system comprises;

a phase-controllable oscillator for producing a reference signal phase synchronized to said sync burst signal;

demodulator means for utilizing said reference signal to derive said color information signals from said modulated subcarrier;

a detector responsive to said reference signal and to said sync burst signal for generating a control signal having an amplitude which varies with variations in a predetermined characteristic of said reference signal or said sync burst signal;

means for utilizing said control signal to adjust an operating parameter of said system that controls said predetermined signal characteristic; and means coupled between said oscillator and said demodulator means for translating said reference signal to said demodulator means only during the intervals between said sync burst signals and for rendering said detector responsive only during the presence of said burst signals.

18. A system as described in claim 17 in which said detector receives said reference signal and said sync burst in phase quadrature and derives therefrom a control signal indicative of the sense and extent in which the phase of said reference signal deviates from a predetermined phase condition, and in which said means for utilizing said control signal adjusts said oscillator to maintain said reference signal in said predetermined phase condition.

19. A system in accordance with claim 18 which includes another detector, means for applying said reference signal and sync burst to said other detector in an in-phase relation to develop a second control signal indicative of amplitude variations of said sync burst, and means for utilizing said second control signal to maintain said sync burst at a substantially constant amplitude, and in which said means for translating said reference signal renders said other detector responsive only in time coincidence with the response intervals of said quadrature-phase detector.

20. A chrominance demodulation system as described in claim 17 wherein said translating means includes a hue control arrangement for providing an adjustable amount of phase shift to said reference signal as translated to said demodulator means.

21. A chrominance demodulation system as described in claim 20 wherein said hue control arrangement comprises:

a differential amplifier formed of first and second reference-signal amplifying devices each having input, output and common electrodes and at least one being gain dependent on an applied control voltage;

phase-shifting means coupled between the output electrodes of said reference-signal amplifying devices;

means for applying said reference signal concurrently to the input electrodes of said reference-signal amplifying devices;

means coupled to said output electrodes of said reference-signal amplifying devices for applying said reference signal to said demodulator means with a phase related to the differential gain of said reference-signal amplifying devices; and means comprising an adjustable voltage source for applying a control voltage of adjustable amplitude to said one reference-signal amplifying device to vary the relative gain of said reference-signal amplifying devices and hence the hue of the image produced by said image reproducer.

22. A chrominance demodulation system for developing from a phase and amplitude modulated subcarrier and periodically recurrent reference burst signals a plurality of color information signals for application to the image reproducer of a color television receiver, which system comprises:

a phase controllable oscillator for generating a reference signal phase-synchronized to said sync burst signal;

demodulator means for utilizing said subcarrier and reference signals to develop a plurality of color information signals;

translating means comprising a reference-signal amplifier having input, output and common electrodes, with said input electrode coupled to said oscillator and said output electrode coupled to said demodulator means to apply said reference signal thereto, said reference-signal amplifier being normally conductive and establishing said input electrode at a potential of a given polarity and a predetermined minimum amplitude but being nonconductive in the presence of an applied gating signal to reduce the potential of said input electrode to a level below said minimum amplitude;

means for applying a gating signal, occurring in time coincidence with said sync burst signal, to said reference signal amplifier;

a detector which is conditionally responsive to said reference signal and to said sync burst signal for generating a control signal having an amplitude varying with variations in a predetermined characteristic of said signals and which is subject to being rendered nonresponsive by the application of a control potential of said given polarity and minimum amplitude;

means for utilizing said control signal to adjust an operating parameter of said system that controls said predetermined signal characteristic;

and means, including a connection from said detector to said input electrode, for applying said reference signal to said detector and for conditioning said detector to respond thereto only during the occurrence of said sync burst signal.